UNITED STATES PATENT OFFICE.

JOHN D. PENNOCK, LOUIS C. JONES, AND FRED L. GROVER, OF SYRACUSE, NEW YORK, ASSIGNORS TO THE SOLVAY PROCESS COMPANY, OF SOLVAY, NEW YORK, A CORPORATION OF NEW YORK.

PROCESS OF SEPARATING MIXED POTASSIUM CHLORID AND BORAX.

1,215,576. Specification of Letters Patent. Patented Feb. 13, 1917.

No Drawing. Original application filed January 14, 1916, Serial No. 72,032. Divided and this application filed September 12, 1916. Serial No. 119,629.

*To all whom it may concern:*

Be it known that we, JOHN D. PENNOCK, LOUIS C. JONES, and FRED L. GROVER, citizens of the United States, residing at Syracuse, in the county of Onondaga and State of New York, have invented a new and Improved Process of Separating Mixed Potassium Chlorid and Borax, of which the following is a specification.

In an application for Letters Patent of the United States, Serial No. 72,032, filed by us Jan. 14, 1916, of which the present application is a division, we have described a process of recovering constituents of value from natural alkaline deposits, in which process potassium chlorid and borax are precipitated together. The object of our improvement herein described is to effect the separation of the mixed potassium chlorid and borax to the end of separately recovering each of these in a pure state and in an economical manner.

Our process which is cyclical in character, the solution employed being reconstituted in each repetition of the operation, may be described as beginning with the addition of the salts to be separated to a solution of the same which, at a high temperature, 82° C. and upward, is entirely saturated with potassium chlorid but below the saturation point in sodium tetraborate. Since the solution is fully saturated with potassium chlorid the added potassium chlorid is not dissolved while the borax of the mixture, since borax is more soluble at the high temperature, goes into solution. The addition of the mixed salts is continued until the solution is just saturated with sodium tetraborate at the temperature employed, that is to say, as much of the mixture is added as can be without causing precipitation of borax, and the solution is then allowed to stand until equilibrium has been attained, when the potassium chlorid is filtered off hot.

It will be evident that the quantity of the mixed salts which can be added without precipitation of borax, will vary with the temperature of the solution, the higher the temperature the greater being the quantity of sodium tetraborate taken into solution. After the removal of the potassium chlorid water is added in sufficient quantity to prevent the precipitation of potassium chlorid when the solution is cooled, that is to say, so much that the solution will be less than saturated with potassium chlorid at a lowered temperature, and the solution is then cooled to approximately 28° C., whereupon borax crystallizes out in a pure state, and the crystals are filtered out.

The mother liquor from which the borax has been crystallized will have approximately the composition of 23.6 parts of potassium chlorid and 8.6 parts sodium tetraborate in 67.8 parts water, and when cold is fully saturated with both potassium chlorid and sodium tetraborate. This is then heated until the water added as above stated is evaporated off and the solution is at a high temperature as before. The solution is then in the same condition as at the outset being fully saturated with potassium chlorid but less than saturated with sodium tetraborate and a batch of the mixed salts is added as before. Thus the operation is repeated, with recurrent recovery of potassium chlorid from the hot crops and of borax from the cold crops and reconstitution of the solution employed.

It will be evident that in initiating the process the potassium chlorid and borax mixture may be added to a solution containing any proportion of the salts or to pure water. After two or three runs, however, a mother liquor having the constitution above stated will be arrived at and will be constant, the operation being repeated with exactness.

While our process is particularly intended to be applied to the separation of the potassium chlorid-borax mixture obtained in the process described in our application above referred to it is also practically applicable to the separation of any mixtures of the salts having compositions varying between 85–15 per cent. KCl. and 15–85 per cent. $Na_2B_4O_7.10H_2O$. In the case of mixtures outside these limits purification by washing of successive batches with the same wash water, or repeated recrystallizations from the same mother liquor would be expedient; but when the wash water or mother liquor becomes saturated with the material originally present in lesser amount, then our process must be resorted to in working up this liquor.

Having thus described our invention what we claim as new and desire to secure by Letters Patent is:

1. The process of separately recovering potassium chlorid and borax from a mixture thereof which consists in adding the mixed salts to a highly heated solution of the same which at high temperature is fully saturated with potassium chlorid and less than saturated with sodium tetraborate, filtering out the undissolved potassium chlorid and adding water in sufficient quantity to prevent the precipitation of potassium chlorid when the solution is cooled and finally cooling the solution to crystallize out borax and filtering off the borax.

2. The process of separately recovering potassium chlorid and borax from a mixture thereof which consists in adding the mixed salts to a highly heated solution thereof which at a high temperature is saturated with potassium chlorid but less than saturated with sodium tetraborate until the solution is just saturated with sodium tetraborate, removing the undissolved potassium chlorid from the hot solution and adding water in sufficient quantity to prevent the precipitation of potassium chlorid when the solution is cooled and finally cooling the solution to crystallize out borax and filtering off the borax.

3. The process of separately recovering potassium chlorid and borax from a mixture thereof which consists in adding the mixed salts to a highly heated solution thereof which at a high temperature is saturated with potassium chlorid but less than saturated with sodium tetraborate, removing the undissolved potassium chlorid from the solution and adding water in sufficient quantity to prevent the precipitation of potassium chlorid when the solution is cooled, cooling the solution to crystallize out borax and filtering off the borax and finally heating to evaporate the added water and reconstitute the solution as at the outset to receive a fresh batch of the mixed salts.

4. The process of separately recovering potassium chlorid and borax from a mixture thereof which consists in adding the mixed salts to a highly heated solution thereof which at a high temperature is saturated with potassium chlorid but less than saturated with sodium tetraborate until the solution is just saturated with sodium tetraborate, removing the undissolved potassium chlorid from the hot solution and adding water in sufficient quantity to prevent the precipitation of potassium chlorid when the solution is cooled, cooling the solution to crystallize out borax and filtering off the borax and finally heating to evaporate the added water and reconstitute the solution as at the outset to receive a fresh batch of the mixed salts.

5. The process of separately recovering potassium chlorid and borax from a mixture thereof which consists in forming a solution having approximately the composition 23.6 parts potassium chlorid and 8.6 parts sodium tetraborate in 67.8 parts water, highly heating and concentrating the solution until at a high temperature it is fully saturated with potassium chlorid, adding the mixed salts to the solution until it is, at the high temperature, saturated with sodium tetraborate without precipitation of borax, removing from the solution the undissolved potassium chlorid while the solution is hot, adding to the solution the amount of water before removed by evaporation and finally cooling the solution to crystallize out borax and removing the borax.

In testimony whereof we have affixed our signatures this 8th day of September, 1916.

JOHN D. PENNOCK.
LOUIS C. JONES.
FRED L. GROVER.